US008095877B1

(12) United States Patent
Szonn et al.

(10) Patent No.: US 8,095,877 B1
(45) Date of Patent: Jan. 10, 2012

(54) METHOD AND GRAPHICAL USER INTERFACE FOR DISPLAYING AN OUTPUT PREVIEW IN A FORM-BASED APPLICATION

(75) Inventors: Sabina Szonn, San Diego, CA (US); Morris Neer, San Diego, CA (US); Martin Lewandowski, San Diego, CA (US); Leslie Skelly, San Diego, CA (US); Helen Welbourn, San Diego, CA (US); Maude Harris, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 1349 days.

(21) Appl. No.: 11/496,775

(22) Filed: Jul. 31, 2006

Related U.S. Application Data

(63) Continuation-in-part of application No. 11/445,038, filed on May 31, 2006.

(60) Provisional application No. 60/811,842, filed on Jun. 7, 2006.

(51) Int. Cl.
*G06F 17/00* (2006.01)

(52) U.S. Cl. ........................................................ 715/274

(58) Field of Classification Search .................. 715/214, 715/274
See application file for complete search history.

(56) References Cited

U.S. PATENT DOCUMENTS

| 5,640,580 | A  | * | 6/1997  | Slayden et al. | 715/209 |
|-----------|----|---|---------|----------------|---------|
| 7,234,103 | B1 | * | 6/2007  | Regan          | 715/234 |
| 7,610,227 | B2 | * | 10/2009 | Wyle           | 705/31  |
| 2003/0036912 | A1 | * | 2/2003 | Sobotta et al. | 705/1  |
| 2006/0155618 | A1 | * | 7/2006 | Wyle           | 705/31 |
| 2007/0106560 | A1 | * | 5/2007 | Shields        | 705/26 |
| 2007/0136157 | A1 | * | 6/2007 | Neher et al.   | 705/31 |

OTHER PUBLICATIONS

Newmark, Richard I, "Taxact 2000 Standard and Taxact 2000 Deluxe", 2001, Journal of the American Taxation Association, pp. 1-13.*
Greenland et al, "IRS Post-Filing Processes Simulation Modeling: A Comparsion of Des With Econometric Microsimulation in Tax Adminstration", IEEE, 2007, pp. 1268-1274.*
Amrutharaj PG, "Web-Based Income Tax Filing System (WITFS) Project Report", ACM, 2005, pp. 1-33.*

* cited by examiner

*Primary Examiner* — Doug Hutton, Jr.
*Assistant Examiner* — James Debrow
(74) *Attorney, Agent, or Firm* — Osha · Liang LLP

(57) ABSTRACT

A computer readable medium includes executable instructions for displaying an output preview for a form-based application by accessing an output preview interface of the form-based application, displaying a navigation interface in the output preview interface, where the navigation interface includes a forms subgroup, and where the forms subgroup includes multiple forms of the form-based application, and displaying a form preview of a form of the forms subgroup.

26 Claims, 3 Drawing Sheets

METHOD AND GRAPHICAL USER INTERFACE FOR DISPLAYING AN OUTPUT PREVIEW IN A FORM-BASED APPLICATION

CROSS-REFERENCE TO RELATED APPLICATIONS

This application is a continuation-in-part of copending U.S. patent application Ser. No. 11/445,038, filed on May 31, 2006 and entitled "Method and Graphical User Interface for Managing Output Settings in a Form-Based Application," the entire contents of which are incorporated herein by reference. The referenced application is co-owned by the same assignee.

This application claims benefit of U.S. Provisional Patent Application No. 60/811,842, filed on Jun. 7, 2006 and entitled "Method and Graphical User Interface for Displaying an Output Preview in a Form-Based Application," in the names of Sabina Szonn, Morris Neer, Martin Lewandowski, Leslie Skelly, Helen Welbourn, and Maude Harris.

BACKGROUND

Many software applications today are form-based in that they offer the ability to manage, modify, and output multiple forms associated with a common task. For example, financial management software may include a number of forms associated with a client, project, or user, including billing summaries, expense reports, payroll reports, insurance forms, tax forms, etc. Form-based applications may also be used in other subject areas, such as project planning, resource management, medicine, or any other subject area where forms provide utility.

In many cases, a user of a form-based application may wish to output multiple forms at once. For example, the user may wish to output multiple forms in a category of forms, multiple copies of the same form, etc. Depending on the specific forms and/or number of forms selected for outputting, the output may span many pages. Thus, it may be difficult for the user to determine whether all of the desired forms will be outputted, how many copies of a form will be outputted, whether any undesired forms will be outputted, etc.

SUMMARY

In general, in one aspect, the invention relates to a computer readable medium comprising executable instructions for displaying an output preview for a form-based application by accessing an output preview interface of the form-based application, displaying a navigation interface in the output preview interface, wherein the navigation interface comprises a first forms subgroup, and wherein the first forms subgroup comprises a plurality of forms of the form-based application, and displaying a form preview of a form of the first forms subgroup.

In general, in one aspect, the invention relates to a graphical user interface displaying an output preview for a form-based application, comprising an output preview interface configured to display a form preview of a form of a first forms subgroup, and a navigation interface within the output preview interface and configured to display the first forms subgroup, wherein the first forms subgroup comprises a plurality of forms of the form-based application.

Other aspects of the invention will be apparent from the following description and the appended claims.

DETAILED DESCRIPTION

Figure 1:
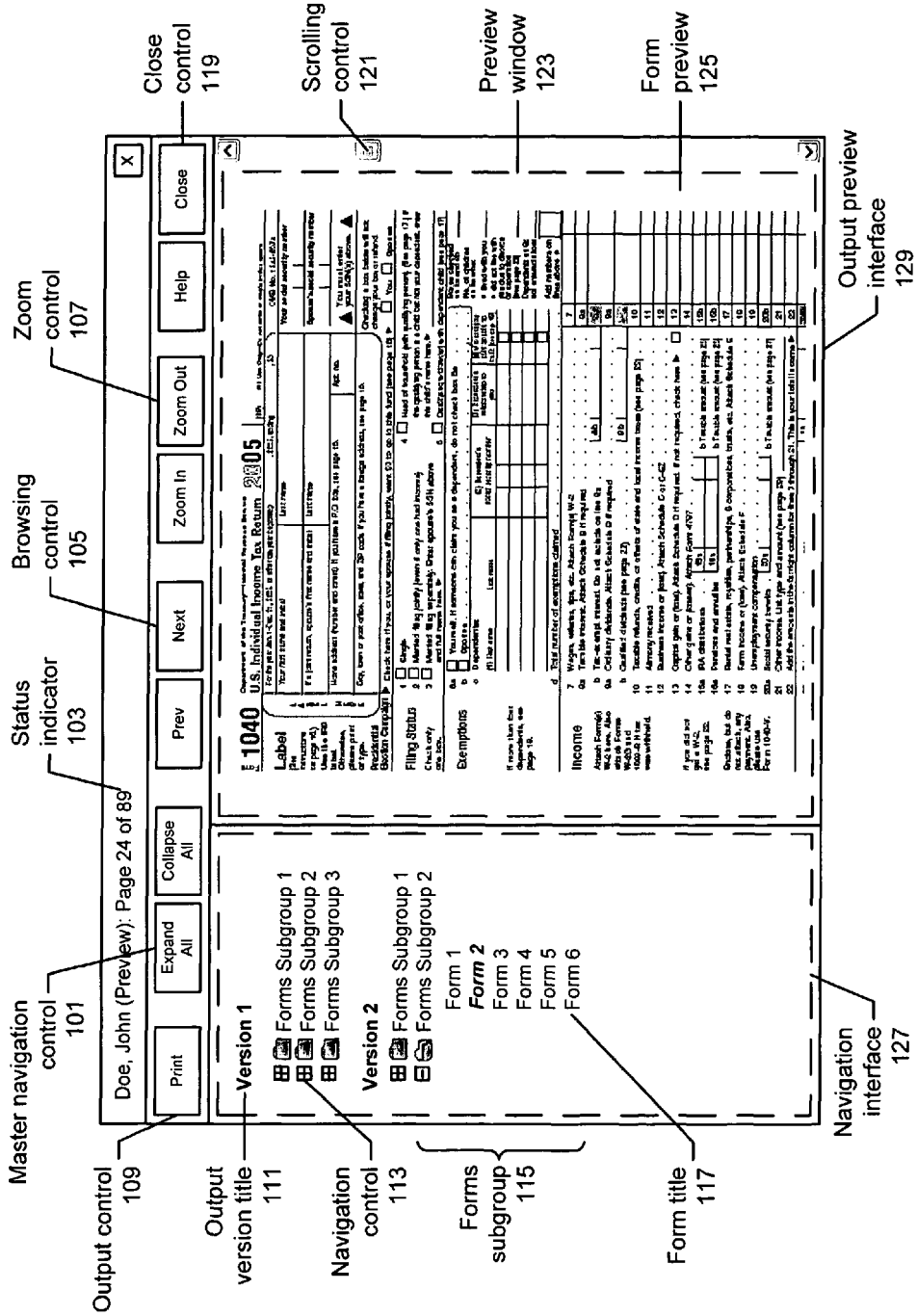
FIG. 1 shows a diagram of a graphical user interface in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and graphical user interface to display an output preview for a form-based application. A navigation interface is displayed that includes one or more forms subgroups. A forms subgroup is a grouping of one or more forms. Specifically, a forms subgroup may contain multiple related forms. For example, if the form-based application is tax-related, then forms subgroups may exist for tax forms, form instructions, tax worksheets, etc. Further, if a forms subgroup is expanded, a user may view a title for each form in the forms subgroup, signifying that the form-based application is configured to output the form.

FIG. 1 shows a diagram of a graphical user interface in accordance with one or more embodiments of the invention. Specifically, FIG. 1 shows a diagram of an output preview interface (129) for a form-based application in accordance with one or more embodiments of the invention.

In one or more embodiments of the invention, the output preview interface (129) includes a navigation interface (127) that may be configured to display one or more forms subgroups (e.g., 115). The navigation interface (127) may be a hierarchical navigation structure, a list, tables, selectable images or text, a rotating display, or any other similar type of interface. Each forms subgroup (e.g., 115) displayed in the navigation interface (127) may take the form of a hierarchical entity, an image, text, or any other type of subgroup representation. Further, a forms subgroup (e.g., 115) may include one or more forms. In addition, one or more forms subgroups (e.g., 115) may be included in one or more output versions (e.g., 111). Further, in one or more embodiments of the invention, a forms subgroup (e.g., 115) may also include one or more documents that are not forms. For example, a forms subgroup (e.g., 115) may include a letter, an invoice, a scanned document, an email, or any other similar type of document.

In one or more embodiments, a forms subgroup (e.g., 115) may be displayed in collapsed form—i.e., with only a general representation, such as a textual title, of the forms subgroup (e.g., 115) displayed. Alternatively, a forms subgroup (e.g., 115) may be displayed in expanded form—i.e., with one or more form titles (e.g., 117) of forms in the forms subgroup (e.g., 115) displayed. In one or more embodiments of the invention, the form title(s) (e.g., 117) may be displayed as text, icons, images, or any other suitable representation of a form. Any combination of collapsed and/or expanded forms subgroups may be displayed. Further, forms subgroups may be nested. In other words, expanding a forms subgroup (e.g., 115) may reveal a nested forms subgroup (not shown).

In one or more embodiments of the invention, the ability to display a form title (e.g., 117) signifies that the form-based application is configured to output the form. Specifically, in one or more embodiments of the invention, the form-based application may be configured to output the form using a custom output setting control in an output customization interface (not shown). Custom output setting controls are discussed in detail in copending U.S. patent application Ser. No. 11/445,038, filed on May 31, 2006 and entitled "Method and Graphical User Interface for Managing Output Settings in a Form-Based Application," referenced above.

In one or more embodiments of the invention, the navigation interface (127) may include one or more navigation controls (e.g., 113) configured to navigate to a form title (e.g., 117) and/or forms subgroup (e.g., 115). Each navigation control (e.g., 113) may be a selectable image or text, a keyboard shortcut, a dropdown, a checkbox, a dynamic list, or any other type of control for navigating the navigation interface (127). Further, the navigation interface (127) may include one or more master navigation controls (e.g., 101) configured to perform navigation operations on multiple form titles (e.g., 117) and/or forms subgroups (e.g., 115). Each master navigation control (e.g., 101) may be a selectable image or text, a keyboard shortcut, a dropdown, a checkbox, a dynamic list, or any other type of control providing master navigation functionality. Navigation operations performed by a master navigation control (e.g., 101) may include expanding or collapsing all forms subgroups (e.g., 115), selecting multiple form titles (e.g., 117), or any other type of navigation action performed on multiple forms subgroups (e.g., 115) and/or form titles (e.g., 117).

In one or more embodiments of the invention, the form-based application may be configured to manage multiple groupings of forms and/or forms subgroups (e.g., 115). For example, if the form-based application is tax-related, multiple groupings of forms and/or forms subgroups (e.g., 115) may be configured to represent a client copy of a tax return, a preparer copy of a tax return, a filing copy of the return, etc. Each grouping of related versions of forms and/or forms subgroups (e.g., 115) is hereinafter referred to as an "output version." In one or more embodiments of the invention, the same forms and/or forms subgroups (e.g., 115) may be included in multiple output versions. For example, in the tax return example given above, the client copy, the preparer copy, and the filing copy each constitute a separate output version. Accordingly, in one or more embodiments of the invention, a 1040 form, or any other similar type of form, may be included in each of these output versions. Accordingly, each forms subgroup (e.g., 115) in the navigation interface (127) may be associated with one or more output versions (e.g., 111).

In one or more embodiments of the invention, different forms to be outputted for each output version may be selected using custom output setting controls in an output customization interface (not shown). Custom output setting controls are discussed in detail in copending U.S. patent application Ser. No. 11/445,038, filed on May 31, 2006 and entitled "Method and Graphical User Interface for Managing Output Settings in a Form-Based Application," referenced above. Further, in one or more embodiments of the invention, one or more of the form titles (e.g., 117) may include functionality to enable and/or disable outputting of the associated form. For example, right-clicking on a form title (e.g., 117) may initialize a menu that includes output preferences for the associated form.

Continuing with discussion of FIG. 1, if a forms subgroup (e.g., 115) is associated with an output version, the navigation interface (127) may include an output version title (e.g., 111) indicating an output version with which the forms subgroup (e.g., 115) is associated. In one or more embodiments of the invention, the output version title (e.g., 111) may be a navigation tab, text, an image, or any other suitable representation of an output version.

In one or more embodiments of the invention, the output preview interface (129) may include a preview window (123) configured to display one or more form previews (e.g., 125) of forms from the forms subgroup(s) (e.g., 115) and/or output versions. In one or more embodiments of the invention, a form preview (e.g., 125) may include text, images (e.g., a barcode, a photograph, an icon, etc.), or any other similar type of form information. Further, in one or more embodiments of the invention, if more than one form preview (e.g., 125) is displayed, the form previews (e.g., 125) may be displayed next to each other (i.e., tiled), overlapping, in separate windows, or any other similar way.

In one or more embodiments of the invention, the form preview (e.g., 125) may be displayed when the output preview interface (129) is initially accessed. For example, when the output preview interface (129) is initially accessed, the last form of the last forms subgroup (e.g., 115) shown in the navigation interface (127) may be displayed. Alternatively, any other form may be displayed, based on any combination of default settings, user-configured settings, and/or whichever form was most recently displayed. Further, a form preview (e.g., 125) may be accessed by selecting an output version title (e.g., 111), forms subgroup (e.g., 115), or form title (e.g., 117) in the navigation interface (127). In one or more embodiments of the invention, the form preview (e.g., 125) may be read-only, editable, or partly editable. Whether or not an form preview (e.g., 125) is editable may depend on the specific form being previewed.

In one or more embodiments of the invention, the output preview interface (129) may include a scrolling control (121) for viewing different parts of the currently displayed form and/or a different form. For example, a different form (i.e., a different form in the same forms subgroup (e.g., 115) or in a different forms subgroup (e.g., 115)) may be displayed if the beginning or end of the current form is reached. Further, in one or more embodiments of the invention, the output preview interface (129) may include one or more zoom controls (e.g., 107) for zooming in and/or out of the form preview (e.g., 125) to display a zoomed form preview (not shown).

In one or more embodiments of the invention, the output preview interface (129) may include one or more browsing controls (e.g., 105). In one or more embodiments of the invention, one or more of the browsing control(s) (e.g., 105) may be used to cause the preview window (123) to display the next page of a currently displayed form preview (e.g., 125) and/or a different (i.e., previous or next) form. For example, if the end of the currently displayed form preview (e.g., 125) is reached, the next form may be displayed. Further, one or more of the browsing control(s) (e.g., 105) may be used to cause the navigation interface (127) to navigate to a different forms subgroup (e.g., 115) and/or different output version. In one or more embodiments of the invention, a change in the navigation interface (127) may cause a corresponding change in the preview window (123). For example, if a user selects a forms subgroup (e.g., 115), then the preview window (123) may display the first form of the selected forms subgroup (e.g., 115). In one or more embodiments, some or all of the aforementioned types of browsing controls (e.g., 105) may be used.

In one or more embodiments of the invention, the output preview interface (129) may include one or more status indicators (e.g., 103). Specifically, in one or more embodiments of the invention, the status indicator(s) (e.g., 103) may be configured to display contextual information about the output preview interface (129). For example, a status indicator (e.g., 103) may display a page number for the currently previewed form, relative to a total page number for all forms in one or more forms subgroups (e.g., 115). Further, a status indicator (e.g., 103) may display a project name (i.e., a client name, a user-specified name, etc.), a date, or any other type of contextual information for the output preview interface (129).

In one or more embodiments of the invention, the output preview interface (129) may include an output control (e.g., 109) configured to output one or more of the forms included in the navigation interface (127). The output may be in the form of a paper document, an electronic document such as a text file, a Portable Document Format (PDF) file, a Microsoft® Word document, an image, or any other type of output. In one or more embodiments, using the output control (e.g., 109) may invoke another application, such as a print driver, document creation interface, image rendering interface, or any other type of output application that performs additional steps of the output operation.

In one or more embodiments of the invention, the output preview interface (129) may include a close control (119) for closing the output preview interface (129). In one or more embodiments of the invention, when the output preview interface (129) is closed (i.e., by using the close control (119) or by any other means), the status of the navigation interface (127) and/or preview window (123) may be saved in a database, text file, or any other location. Specifically, the status of the navigation interface (127) and/or preview window (123) may be saved so that the status can be restored the next time a user accesses the output preview interface (129).

Figure 2:
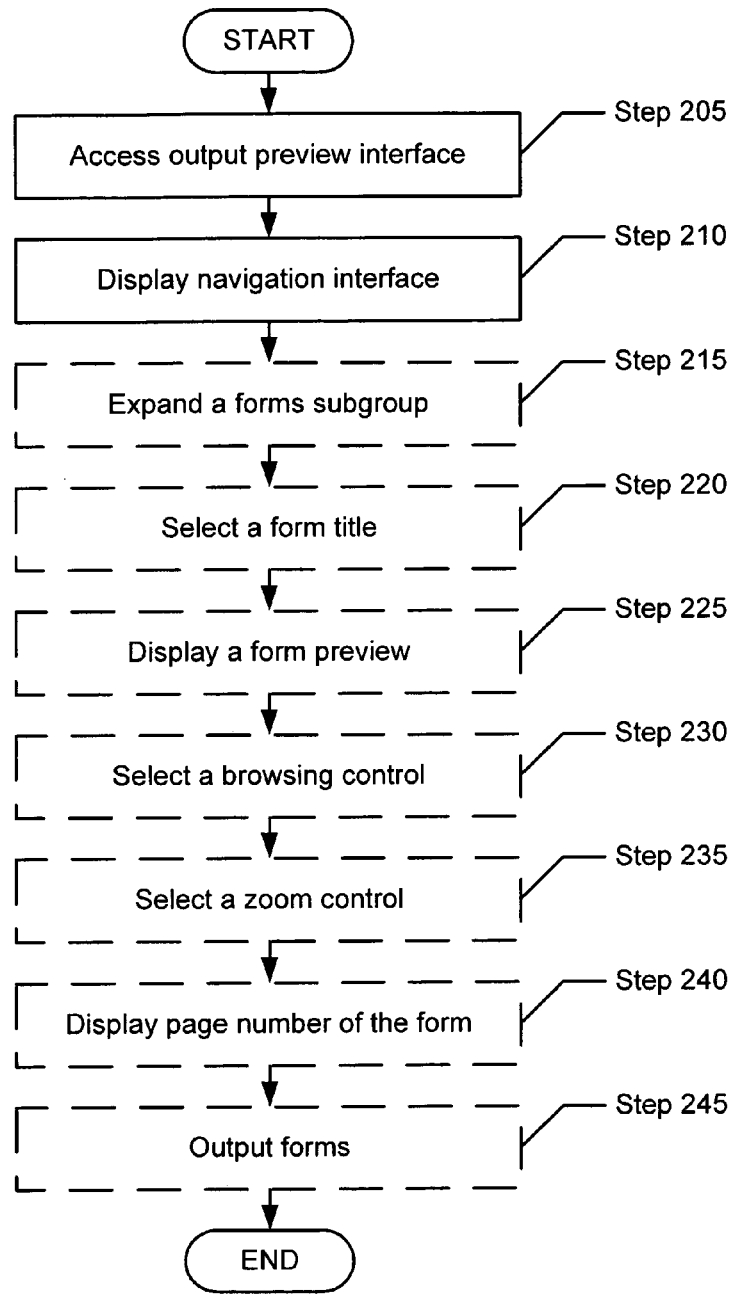
FIG. 2 shows a flow chart in accordance with one or more embodiments of the invention.

FIG. 2 shows a flowchart in accordance with one or more embodiments of the invention. Specifically, FIG. 2 shows a flowchart of a method for displaying an output preview in accordance with one or more embodiments of the invention.

Initially, a user accesses an output preview interface for a form-based application (Step 205). The output preview interface may be accessed from any other interface of the form-based application. For example, the output preview interface may be accessed using an output control of an output customization interface. Different types of output controls are discussed in detail in copending U.S. patent application Ser. No. 11/445,038, filed on May 31, 2006 and entitled "Method and Graphical User Interface for Managing Output Settings in a Form-Based Application," referenced above.

The output customization interface includes a navigation interface, which is displayed when the output customization interface is accessed (Step 210). For example, the navigation interface may be a hierarchical navigation structure or any other type of navigation interface, as discussed above. The navigation interface may include one or more forms subgroups, each forms subgroup containing one or more forms. Further, each forms subgroup may be associated with an output version, as discussed above.

When the navigation interface is initially displayed (i.e., Step 210), the navigation interface may include one or more forms subgroups that are already expanded (i.e., having one or more form titles already visible). Further, a form preview may be displayed (i.e., Step 225, discussed below) when the navigation interface is initially accessed. Alternatively, the navigation interface initially displayed may simply include one or more collapsed forms subgroups. In one or more embodiments of the invention, the forms subgroups may be displayed in the order in which they are to be outputted, in alphabetical order, in order of importance, or any other similar type of ordering.

Continuing with discussion of FIG. 2, Steps 215-245, discussed below, are optional. In other words, in one or more embodiments, some or all of Steps 215-245 may not be performed. Further, Steps 215-245 may be performed in any order, and one or more of Steps 215-245 may be repeated any number of times. For example, if multiple titles of forms are accessible in the navigation interface, the user may choose to view form previews for multiple forms.

In Step 215, the user expands a forms subgroup (e.g., by selecting a title of the forms subgroup) to display one or more form titles. In one or more embodiments of the invention, the form titles may be displayed in the order in which they are to be outputted, in alphabetical order, in order of importance, or any other similar type of ordering. When the forms subgroup is expanded, a form preview may automatically be displayed (i.e., Step 225, discussed below). For example, a form preview may be automatically displayed for the first form in the forms subgroup. Alternatively, the form title(s) may simply be displayed. As discussed above, displaying a form title may signify that the form-based application is configured to output the form. However, a forms subgroup need not be expanded for its associated forms to be outputted; rather, the ability to expand the forms subgroup to display the titles of forms serves an informative purpose for the user.

In Step 220, when a form title is displayed in the navigation interface (i.e., on initial display of the navigation interface, after a forms subgroup is expanded, or at any other time), the user may select the form title. In one or more embodiments, selecting the form title may cause a form preview for the form to be displayed (i.e., Step 225, discussed below). Further, selecting the form title may case a page number of the form to be displayed (Step 240), or any other type of data relevant to the form.

In Step 225, a form preview is displayed. Different types of form previews are discussed above in relation to FIG. 1. When a form preview is displayed, a user may select a browsing control to display a different form preview (i.e., for a form in the same forms subgroup or a different forms subgroup) (Step 230). Such a browsing control may provide an efficient mechanism for the user to preview multiple forms. Further, the user may select a zoom control to display a zoomed form preview (Step 235). The zoom control may allow the user to more easily view contents of the form.

At any time when a form title is selected and/or a form preview for the form is displayed, a page number of the form relative to a total page count may be displayed (Step 240). For example, the page number may indicate the form's relative position in a forms subgroup and/or output version. Further, the page number may indicate which specific page of a multi-page form is presently being previewed. Other types of information about the form (e.g., file size, file type, a project name, etc.) may also be displayed.

In Step 245, multiple forms are outputted. For example, all forms in one or more forms subgroups or output versions may be outputted. Different types of outputting are discussed above. In one or more embodiments of the invention, previewing forms (i.e., one or more of Steps 215-240) may not be required prior to outputting the forms. Further, in one or more embodiments of the invention, if one or more of the forms subgroups includes documents that are not forms, one or more of the non-form documents may also be outputted.

One or more embodiments of the invention provide a convenient means of previewing multiple forms, forms subgroups, and/or output versions, prior to outputting the previewed item(s). Specifically, a user may be able to easily determine which output versions, forms subgroups, and/or individual forms a form-based application is configured to output. Accordingly, displaying an output preview as described herein may reduce the incidence of output errors, and may provide for a generally more informative user experience.

Figure 3:
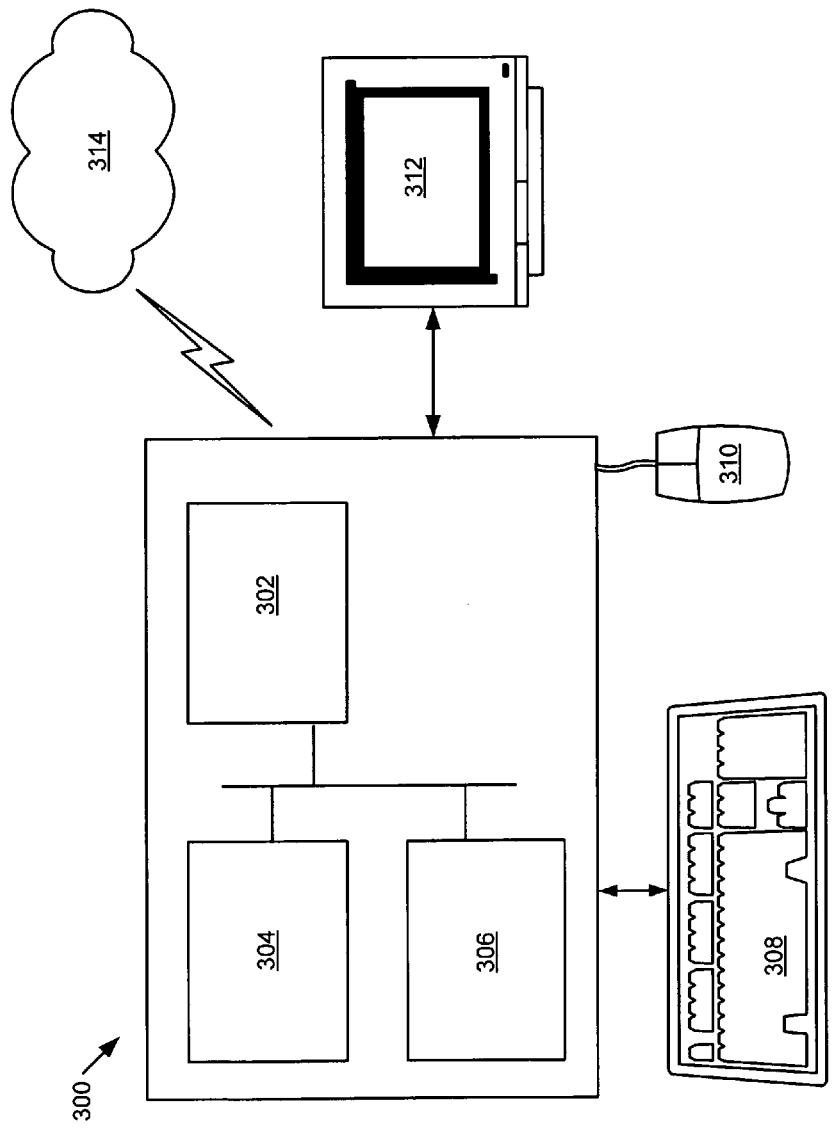
FIG. 3 shows a diagram of a computer system in accordance with one or more embodiments of the invention.

The invention may be implemented on virtually any type of computer regardless of the platform being used. For example, as shown in FIG. 3, a computer system (300) includes a processor (302), associated memory (304), a storage device (306), and numerous other elements and functionalities typical of today's computers (not shown). The computer (300) may also include input means, such as a keyboard (308) and a mouse (310), and output means, such as a monitor (312). The computer system (300) may be connected to a network (e.g., a local area network (LAN), a wide area network (WAN) such as the Internet, or any other type of network) (314) via a network interface connection (not shown). Those skilled in the art will appreciate that these input and output means may take other forms.

Further, those skilled in the art will appreciate that one or more elements of the aforementioned computer system (300) may be located at a remote location and connected to the other elements over a network. Further, the invention may be implemented on a distributed system having a plurality of nodes, where each portion of the invention (e.g., master navigation control, status indicator, browsing control, zoom control, output control, output version title, navigation control, forms subgroup, form title, navigation interface, close control, scrolling control, preview window, form preview, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising executable instructions for displaying an output preview for a project of a form-based application, the project comprising a plurality of output versions, by:
   accessing an output preview interface for the project of the form-based application;
   displaying a navigation interface in the output preview interface,
   wherein the navigation interface comprises a first forms subgroup,
   wherein the first forms subgroup comprises a plurality of prepared forms of the form-based application and a document submitted by a user to provide support for content in one of the plurality of prepared forms, and
   wherein the document is not included in the plurality of prepared forms of the form-based application;
   selecting, for the project, a first selection of a comprehensive output version of the plurality of output versions, wherein the comprehensive output version is configured for a first client of a preparer of the first forms subgroup and comprises the first forms subgroup and the document from the first forms subgroup;
   selecting, for the project, a second selection of a summary output version of the plurality of output versions, wherein the summary output version is configured for a second client of the preparer of the first forms subgroup and comprises the first forms subgroup without the document; and
   displaying, based on the first and second selection, a form preview of both the comprehensive output version and the summary output version of the project,
   wherein the comprehensive output version comprises the document and the plurality of prepared forms from the first forms subgroup,
   wherein the summary output version comprises the first forms subgroup without the document, and
   wherein the plurality of prepared forms from the first forms subgroup are filed in a filing output version of the plurality of output versions of the project, and wherein the filing output version is filed without the document.

2. The computer readable medium of claim 1, further comprising executable instructions for displaying the output preview for the form-based application by:
   expanding the first forms subgroup to display a title of the one of the plurality of prepared forms.

3. The computer readable medium of claim 2, wherein displaying the form preview of both the comprehensive output version and the summary output version of the project is performed when the first forms subgroup is expanded.

4. The computer readable medium of claim 2, wherein displaying the form preview of both the comprehensive output version and the summary output version of the project is performed when the user selects the title.

5. The computer readable medium of claim 1, further comprising executable instructions for displaying the output preview for the form-based application by:
   displaying a zoomed form preview of the one of the plurality of prepared forms when the user selects a zoom control.

6. The computer readable medium of claim 1, further comprising executable instructions for displaying the output preview for the form-based application by:
   displaying a form preview of a second forms subgroup when the user selects a browsing control.

7. The computer readable medium of claim 1, further comprising executable instructions for displaying the output preview for the form-based application by:
   outputting the first forms subgroup.

8. The computer readable medium of claim 1, further comprising executable instructions for displaying the output preview for the form-based application by:
   displaying a page number of the one of the plurality of prepared forms in relation to a total page count.

9. The computer readable medium of claim 1, further comprising executable instructions for displaying the output preview for the form-based application by:
   displaying a second forms subgroup in the navigation interface, wherein the second forms subgroup comprises the plurality of prepared forms.

10. The computer readable medium of claim 9, wherein the first forms subgroup is associated with the summary output version and the second forms subgroup is associated with the comprehensive output version.

11. The computer readable medium of claim 10, wherein the first forms subgroup and the second forms subgroup comprise the one of the plurality of prepared forms.

12. The computer readable medium of claim 1, wherein the form-based application is a financial management application.

13. The computer readable medium of claim 12, wherein the financial management application is a tax-related application.

14. A graphical user interface, embodied on a non-transitory computer readable medium, displaying an output preview for a plurality of output versions of a project of a form-based application, the graphical user interface comprising:
   an output preview interface configured to display, based on a first selection of a comprehensive output version of the plurality of output versions and a second selection of a summary output version of the plurality of output versions, a form preview of both a comprehensive output version and a summary output version of the project;
   a navigation interface within the output preview interface and configured to:
   display a first forms subgroup comprising a plurality of prepared forms of the form-based application and a document submitted by a user to provide support for content in the one of the plurality of prepared forms, wherein the document is not included in the plurality of prepared forms of the form-based application;
   select, for the project, the first selection of the comprehensive output version of the plurality of output versions, wherein the comprehensive output version is configured for a first client of a preparer of the first forms subgroup and comprises the first forms subgroup and the document from the first forms subgroup; and
   select, for the project, the second selection of the summary output version of the plurality of output versions, wherein the summary output version is configured for a second client of the preparer of the first forms subgroup and comprises the first forms subgroup without the document,
   wherein the comprehensive output version comprises the document and the plurality of prepared forms from the first forms subgroup,
   wherein the summary output version comprises the first forms subgroup without the document, and
   wherein the plurality of prepared forms from the first forms subgroup are filed in a filing output version of the plurality of output versions of the project, and wherein the filing output version is filed without the document.

15. The graphical user interface of claim 14, wherein the navigation interface comprises a navigation control configured to expand the first forms subgroup to display a title of the one of the plurality of prepared forms.

16. The graphical user interface of claim 15, wherein the form preview of both the comprehensive output version and the summary output version of the project is displayed in the output preview interface when the first forms subgroup is expanded.

17. The graphical user interface of claim 15, wherein the form preview of both the comprehensive output version and the summary output version of the project is displayed in the output preview interface when the user selects the title.

18. The graphical user interface of claim 14, wherein the output preview interface comprises a zoom control configured to cause display of a zoomed form preview of both the comprehensive output version and the summary output version of the project.

19. The graphical user interface of claim 14, wherein the output preview interface comprises a browsing control configured to cause display of the form preview of both the comprehensive output version and the summary output version of the project.

20. The graphical user interface of claim 14, wherein the output preview interface comprises an output control configured to cause output of the first forms subgroup.

21. The graphical user interface of claim 14, wherein the output preview interface comprises a status indicator configured to display a page number of the one of the plurality of prepared forms in relation to a total page count.

22. The graphical user interface of claim 14, wherein the navigation interface is further configured to display a second forms subgroup, wherein the second forms subgroup comprises the plurality of prepared forms of the form-based application.

23. The graphical user interface of claim 22, wherein the first forms subgroup is associated with the summary output version and the second forms subgroup is associated with the comprehensive output version.

24. The graphical user interface of claim 22, wherein the first forms subgroup and the second forms subgroup comprise the one of the plurality of prepared forms.

25. The graphical user interface of claim 14, wherein the form-based application is a financial management application.

26. The graphical user interface of claim 25, wherein the financial management application is a tax-related application.

* * * * *